J. MARTIN.
Tire-Tightener.
No. 197,647. Patented Nov. 27, 1877.
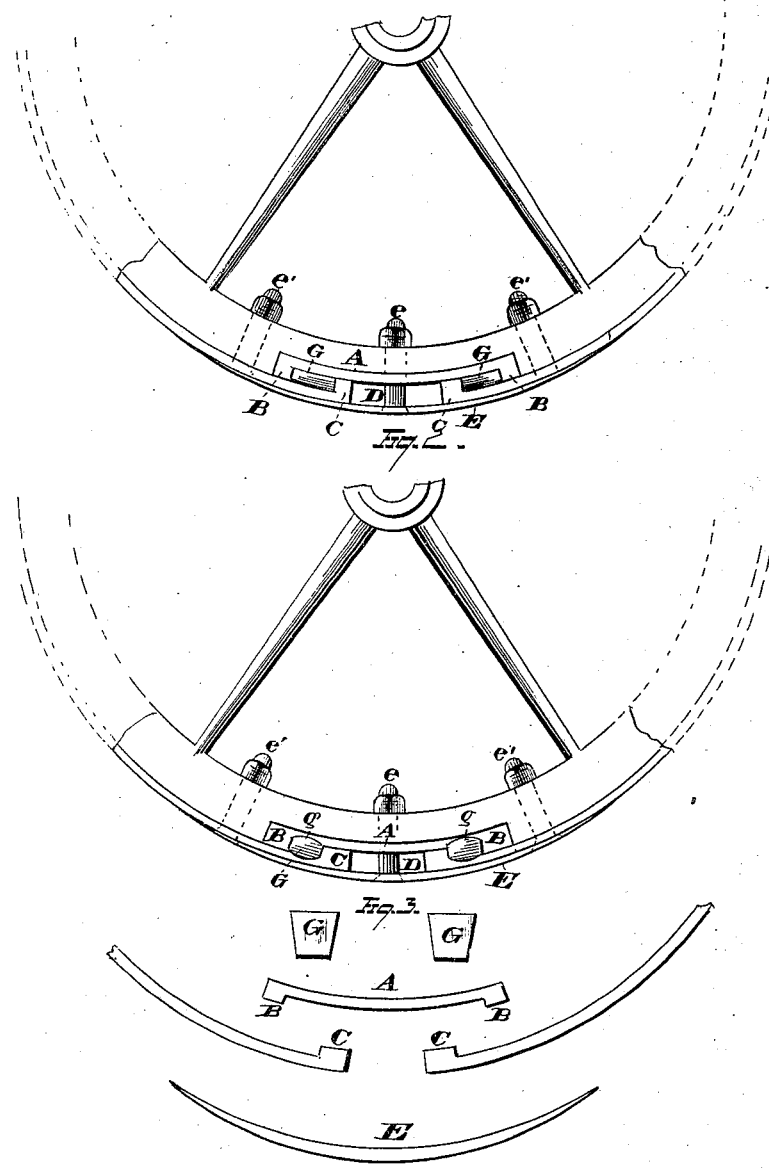

UNITED STATES PATENT OFFICE.

JAMES MARTIN, OF GOLIAD, TEXAS.

IMPROVEMENT IN TIRE-TIGHTENERS.

Specification forming part of Letters Patent No. 197,647, dated November 27, 1877; application filed May 16, 1877.

*To all whom it may concern:*

Be it known that I, JAMES MARTIN, of Goliad, in the county of Goliad and State of Texas, have invented certain new and useful Improvements in Tire-Tighteners; and I do hereby declare the following to be a full, clear, and exact description of the invention, such as will enable others skilled in the art to which it pertains to make and use it, reference being had to the accompanying drawings, which form part of this specification.

My invention relates to certain improvements in tire-tighteners; and is designed to furnish a simple mechanical means for contracting a tire upon its felly without removal therefrom. It consists in providing a recess in the exterior periphery of the felly, in which an engaging-bar is loosely seated, and with this bar the two ends of the tire engage by means of wedges or tapering keys. Either end of the tire is made with a stud or boss, formed in the same piece therewith, which correspond to counter studs or bosses projecting at right angles from the outer face of the engaging-bar at its respective extremities; and between either pair of these corresponding protuberances the keys are driven as wedges to draw together the ends of the tire, which latter is made of dimension such that an open space is left between its ends.

Referring to the drawings, Figure 1 is a view, in side elevation, of a part of a wheel embodying my invention. Fig. 2 is a similar view on the opposite side of the same. Fig. 3 represents parts in detail.

The felly of the wheel is made with a rectangular recess in its outer periphery, extending across it in full cross-section, of any desired length, while its depth is equal to twice the thickness of the tire. Within the recess an independent metallic engaging-bar, A, is placed, which has its main body of a thickness equal to that of the tire, or one-half the depth of the recess in the felly. The two end extremities of this engaging-bar are provided, respectively, with a swelled or headed formation, B, which are preferably made by turning over the original ends of the bar in return-bends and welding the portions thus turned back onto the upper face of the bar. Since the thickness of the main body of this bar A is one-half the depth of the felly-recess, it follows that the enlarged ends B present their outer horizontal face in the same circular plane with that of the felly. The ends of the tire are provided, respectively, with the enlarged formations C, which are made in the same manner as are the heads B, and thus they have a thickness equal to twice that of the body of the tire. These two joining ends have their enlargements C resting upon the engaging-bar between the two enlargements B formed on the ends of the latter, and thus, on account of their relative proportion of parts as regards their thickness, it follows that when the tire is properly placed on the wheel the lower face of the tire has direct bearing upon the upper face of the engaging-bar throughout their entire common cross-sectional line—that is, the enlarged ends of the engaging-bar have contact with the single body of the tire, and the enlarged ends of the tire rest upon the single body of the engaging-bar. The true curve of the tread or wearing-periphery of the tire is thus preserved, and at the same time a solid vertical bearing is afforded the joining ends of the tire as they receive and support the weight of the wheel.

The tire is made shorter than the periphery of the felly to an extent sufficient to form a space, B, between its two ends, which shall be adequate to allow of as great a contraction of the diameter of the tire as would be necessary in tightening it firmly to the felly. Preferably I leave this space open; but, if desired, a block or joining-piece of appropriate dimensions could be placed therein after the tire is tightened, thus giving a continuous surface-tread to the wheel when in use. For such a purpose the joining-piece could have beveled transverse sides, corresponding to counter-bevels incut in the ends C, and be secured against lateral displacement by any suitable engaging device; but this forms no part of my invention, and I prefer, in practice, to leave the space D free and open.

Either end of the tire is provided with a slot, in which engages suitable bolts, which secure the binding-iron E in place upon the tread of the wheel, covering the meeting extremities of the tire, and serving to secure all the parts together. A central bolt, *e*, passes through this binding-iron, the engaging-plate, and felly, and is secured to the inner or smaller periphery of this latter by nuts, similar to engagement of the two end bolts $e'$.

The keys G are wedge-shaped, with tapering or inclined sides, and, by being driven into the openings formed in cross-sectional line between the enlargements B and C, respectively, on either end of the tire and the locking-bar, the two ends of the tire are drawn in opposite directions, and in lines tending to approach one another. When driven sufficiently tight, the keys are detachably secured in place by flanges formed at end of the entering extremity of the keys, as shown at $g$ in Fig. 2; or, instead of these flanged extremities acting as engaging mechanism, I may engage bolts with either end enlargement B, which bolts, by passage through the keys, will hold the same in place.

As the tire wears loose the old keys can be easily withdrawn, and larger ones substituted for them, which will draw the ends of the tire nearer together, lessening its diameter, and contracting it snugly upon its felly; or, instead of withdrawing the former keys, new ones may be introduced side by side with them, thus tightening the tire without throwing away the old keys, and the additional keys will cost less than if new ones were used so as to fill the openings with an entire new wedge made in single piece.

Having fully described my invention, what I claim as new, and desire to secure by Letters Patent, is—

1. The combination, with a tire provided with flanged ends, of an engaging-bar formed with flanged ends, and wedges secured between the ends of the tire and engaging-bar, substantially as and for the purpose set forth.

2. The combination, with a tire and engaging-bar, each of which is formed with flanged ends, and wedges secured between the ends of the tire and engaging-bar, of a binding-iron, which latter serves to constitute a continuous bearing for the wheel, substantially as and for the purpose set forth.

In testimony that I claim the foregoing I have hereunto set my hand this 7th day of May, 1877.

JAMES MARTIN.

Witnesses:
JOHN W. LANDER,
M. N. SHIVE.